3,355,251
DETERMINATION OF CHLORINE DIOXIDE
Paul Willis McConnaughey, Pittsburgh, Pa., assignor to Mine Safety Appliances Company, Pittsburgh, Pa., a corporation of Pennsylvania
No Drawing. Filed Oct. 15, 1964, Ser. No. 404,188
3 Claims. (Cl. 23—232)

ABSTRACT OF THE DISCLOSURE

A colorimetric reagent of granular solid impregnated with N,N,N',N'-tetraphenylbenzidine is used for detecting chlorine dioxide in gases, the presence of which is indicated by the development of a tan color. Chlorine dioxide and chlorine are simultaneously quantitatively determined by passing the gas to be tested through a bed of the indicator and measuring the length of bed that is changed in color, a change to tan color being used to determine chlorine dioxide and a change to blue color being used to determine chlorine.

---

This invention relates to the detection and to the quantitative determination of chlorine dioxide ($ClO_2$) in other gases.

It is an object of this invention to provide a simple and reliable method of detecting or quantitatively determining chlorine dioxide in gases, particularly in air, that may be practiced by unskilled persons, that is satisfactory for plant, field and laboratory use, and that requires only simple, inexpensive and readily available materials and apparatus. Another object is to provide such a method wherein chlorine dioxide is quantitatively determined simultaneously with and independently of the quantitative determination of chlorine.

Stanford and Plantz described in U.S. Patent 2,942,952 a reagent consisting essentially of a granular material impregnated with N,N,N',N'-tetraphenylbenzidine that develops a blue color in the presence of chlorine.

This invention is predicated on the discovery that aforesaid reagent of Stanford and Plantz develops a tan color in the presence of chlorine dioxide and that the development of such color does not impair or adversely affect the response of the reagent to chlorine. When air or other gas to be tested is passed through a body of reagent disposed in a tube of glass or other transparent material that is not affected by the reagent, the presence of chlorine dioxide causes the development of a tan color along the length of the body of reagent in the direction in which the air is passed, thus affording indication of the presence of chlorine dioxide. The length over which the tan coloration occurs is dependent, when tested under standard conditions, upon the concentration of chlorine dioxide in the atmosphere tested. Similarly, the presence of chlorine and chlorine dioxide when the concentration of chlorine is less than about five times the concentration of chlorine dioxide causes the development of a blue stain, the length of which is dependent on the chlorine concentration, and a tan stain, the length of which is dependent on the chlorine dioxide concentration. If the chlorine concentration is greater than about five times the concentration of chlorine dioxide the length of the blue coloration will exceed the length of and conceal the tan stain.

The reagent comprises an inert granular carrier, preferably a granular absorbent, suitably silica gel, impregnated with N,N,N',N'-tetraphenylbenzidine. Illustrative of the reagent, from 0.1 to 300 mg., preferably 3.0 mg., of N,N,N',N'-tetraphenylbenzidine is mixed with 10 cc. of silica gel and the mixture is heated at 120° C. for 45 minutes. The gel is cooled to room temperature and, if desired, water in an amount not over 10% by weight of the final mixture, may be added to the gel and the mixture is agitated until it appears dry and free flowing.

In the practice of the invention the gas to be tested is passed through a body of the gel. Although this may be done in a variety of ways, it is preferred, especially for field use, to apply it in the general manner described in Patent No. 2,174,349 to John B. Littlefield, i.e., an elongate column, or bed, of the inert granular material carrying the reagent is disposed in a small cross-sectional tube of glass or other inert transparent material, held in place by end plugs of, for example, glass wool or glass tape, and the ends of the tube are then sealed. When a determination is to be made the sealed ends are opened and the air or other gas to be tested is flowed through the tube by any suitable means, as by an aspirator bulb. The presence of chlorine dioxide in the atmosphere converts the white gel to a tan color promptly. The presence of chlorine dioxide and chlorine converts a portion of the gel to a tan color and a portion of the gel to a blue color, the length over which the tan and blue coloration occurs being dependent on the concentration of chlorine dioxide and chlorine respectively.

The reagent gel may tend to develop a blue color on storage but this can be inhibited by including in the tube a preservative, or stabilizer, that acts as an anti-oxidant, i.e., an oxygen absorber. This may be accomplished by disposing a suitable oxygen absorber in the tube before it is sealed. One such agent is alkaline pyrogallol which may be prepared by impregnating silica gel with a strong aqueous solution of pyrogallol and mixing in Ascarite (a caustic soda-asbestos composition). Among other materials that function as stabilizers is manganous oxide. A satisfactory preparation may be made by mixing equal parts by volume of manganous chloride ($MnCl_2$) and lithium hydroxide monohydrate ($LiOH \cdot H_2O$); this mixture must be placed in the tubes immediately after preparation, and it should occupy at least 1 percent but not more than 20 percent of the volume of the reagent gel in the tube.

As indicating the sensitivity of the method, it is possible using tubes as described above to detect quantitatively 0.5 p.p.m. by volume of chlorine dioxide in air using a 400 ml./minute sample for 15 seconds with a 3.0 mm. I.D. tube.

The following example illustrates the simultaneous determination of chlorine dioxide and chlorine. Using a 600 ml./min. sample for 23 seconds with a 3.0 mm. I.D. tube as described above the length of bed that changed color was as follows:

| Example | $ClO_2$ Conc. (p.p.m.) | Cl Conc. (p.p.m.) | Length of Color (mm.) | |
|---|---|---|---|---|
| | | | Tan | Blue |
| 1 | 1 | 4 | 21 | 17.5 |
| 2 | 1 | 6 | <24 | 24 |
| 3 | 0.4 | 0 | 16.5 | 0 |
| 4 | 0 | 4 | 0 | 17.5 |

The length of color change is measured from the inlet end of the bed to the line demarking the color change. The blue coloration masks the tan coloration, so, for example, the bed in Example 1 above would be colored blue over a 17.5 mm. length from the inlet end of the bed and colored tan over a 3.5 mm. length from the end of the blue coloration.

According to the patent statutes, I have explained the principle and mode of practicing my invention and have described what I now consider to be its best embodiment. However, I desire to have it understood that, within the scope of the appended claims, the invention may be practiced otherwise than as specifically described.

I claim:
1. A method of detecting chlorine dioxide in a gas which comprises the steps of passing the gas to be tested through a body of inert granular solid carrying N,N,N',N'-tetraphenylbenzidine reagent, said body being confined within a transparent container and said reagent being changed to tan color by contact with chlorine dioxide.

2. A method according to claim 1, in which the chlorine dioxide is quantitatively determined comprising passing a predetermined volume of chlorine dioxide containing gas to be tested through an elongate body of said solid, the change of color occurring over a length that is dependent on the concentration of chlorine dioxide being determined, and measuring the length over which the color change occurs.

3. A method of simultaneously quantitatively determining chlorine dioxide and chlorine which comprises the steps of passing a predetermined volume of gas to be tested through an elongate body of inert granular solid carrying N,N,N',N'-tetraphenylbenzidine reagent, said body being confined within a transparent container, said reagent being changed to a tan color over a length that is dependent on the concentration of chlorine dioxide and being changed to a blue color over a length that is dependent on the concentration of chlorine, and measuring the lengths over which the respective color changes occur.

References Cited
UNITED STATES PATENTS 2,942,952　4/1958　Plantz et al. _____ 23—232

OTHER REFERENCES

Wilson et al.: "Comprehensive Analytical Chemistry," page 345 (1962), Elsevier.

MORRIS O. WOLK, *Primary Examiner.*

L. MEI, E. A. KATZ, *Assistant Examiners.*